United States Patent
Fujishiro (10) Patent No.: US 10,484,924 B2
(45) Date of Patent: Nov. 19, 2019

(54) CORE NETWORK APPARATUS, RADIO TERMINAL, AND BASE STATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 3 days.

(21) Appl. No.: 15/523,814

(22) PCT Filed: Nov. 5, 2015

(86) PCT No.: PCT/JP2015/081212
§ 371 (c)(1),
(2) Date: May 2, 2017

(87) PCT Pub. No.: WO2016/072467
PCT Pub. Date: May 12, 2016

(65) Prior Publication Data
US 2017/0325151 A1 Nov. 9, 2017

(30) Foreign Application Priority Data

Nov. 7, 2014 (JP) ................. 2014-227576

(51) Int. Cl.
*H04W 28/02* (2009.01)
*H04W 40/12* (2009.01)
(Continued)

(52) U.S. Cl.
CPC ......... *H04W 40/12* (2013.01); *H04L 43/0888* (2013.01); *H04W 28/08* (2013.01);
(Continued)

(58) Field of Classification Search
CPC ... H04W 40/12; H04W 28/085; H04W 36/30; H04W 28/08; H04W 36/22; H04W 36/14;
(Continued)

(56) References Cited

U.S. PATENT DOCUMENTS

2006/0068777 A1* 3/2006 Sadowsky ............. H04W 88/06
455/427
2014/0038625 A1* 2/2014 Palanivelu ......... H04W 52/0235
455/450
(Continued)

FOREIGN PATENT DOCUMENTS

JP  2014-022847 A  2/2014
JP  2014-127944 A  7/2014
(Continued)

OTHER PUBLICATIONS

Huawei, China Unicorn; Monitoring UE throughput in WLAN after offloading; 3GPP TSG-RAN3 Meeting #85bis; R3-142210; Oct. 6-10, 2014; Shanghai, China.
(Continued)

*Primary Examiner* — Jay P Patel
(74) *Attorney, Agent, or Firm* — Studebaker & Brackett PC (57) ABSTRACT

A network apparatus according to a first aspect includes a controller configured to measure a throughput of communication which is performed by a radio terminal via a wireless LAN. The controller is configured to give a notification of throughput information indicating the throughput, to a base station constituting a mobile communication network.

8 Claims, 6 Drawing Sheets

(51) Int. Cl.
  *H04W 28/08* (2009.01)
  *H04W 36/14* (2009.01)
  *H04W 36/22* (2009.01)
  *H04W 48/18* (2009.01)
  *H04L 12/26* (2006.01)
  *H04W 36/30* (2009.01)
  *H04W 36/00* (2009.01)
  *H04W 84/12* (2009.01)
  *H04W 36/38* (2009.01)

(52) U.S. Cl.
  CPC ..... *H04W 28/085* (2013.01); *H04W 36/0058* (2018.08); *H04W 36/0085* (2018.08); *H04W 36/14* (2013.01); *H04W 36/22* (2013.01); *H04W 36/30* (2013.01); *H04W 48/18* (2013.01); *H04W 36/38* (2013.01); *H04W 84/12* (2013.01)

(58) Field of Classification Search
  CPC ..... H04W 48/18; H04W 36/38; H04W 84/12; H04L 43/0888; H05K 999/99
  See application file for complete search history.

(56) References Cited

U.S. PATENT DOCUMENTS

| | | | | |
|---|---|---|---|---|
| 2014/0045541 A1* | 2/2014 | Moshfeghi | ............ | H04W 84/00 455/500 |
| 2014/0334465 A1* | 11/2014 | Lee | ............ | H04W 48/18 370/338 |
| 2014/0355536 A1* | 12/2014 | Muley | ............ | H04W 28/0215 370/329 |
| 2015/0109940 A1* | 4/2015 | Okhravi | ............ | H04W 28/08 370/252 |
| 2015/0189468 A1* | 7/2015 | Yuk | ............ | H04W 36/14 455/436 |
| 2015/0208311 A1* | 7/2015 | Lee | ............ | H04W 24/10 455/436 |
| 2015/0215832 A1* | 7/2015 | Fitzpatrick | ............ | H04W 48/18 455/426.1 |
| 2015/0245358 A1* | 8/2015 | Schmidt | ............ | H04L 43/0888 370/329 |
| 2015/0312831 A1* | 10/2015 | Sang | ............ | H04W 36/0083 370/236 |
| 2015/0358909 A1* | 12/2015 | Lee | ............ | H04W 76/27 370/329 |
| 2016/0007247 A1* | 1/2016 | Lee | ............ | H04W 36/0066 370/331 |
| 2016/0044526 A1* | 2/2016 | Pawar | ............ | H04W 28/0226 370/230 |
| 2016/0073287 A1* | 3/2016 | Himayat | ............ | H04W 48/18 370/236 |
| 2016/0080958 A1* | 3/2016 | Rinne | ............ | H04W 24/10 370/338 |
| 2016/0286470 A1* | 9/2016 | Lee | ............ | H04W 48/16 |
| 2016/0295473 A1* | 10/2016 | Lee | ............ | H04W 36/023 |
| 2016/0337960 A1 | 11/2016 | Nagasaka et al. | | |
| 2017/0006475 A1* | 1/2017 | Liu | ............ | H04B 17/336 |
| 2018/0176974 A1* | 6/2018 | Fujishiro | ............ | H04L 5/001 |

FOREIGN PATENT DOCUMENTS

| | | |
|---|---|---|
| WO | 2014/162905 A1 | 10/2014 |
| WO | 2015/178138 A1 | 11/2015 |

OTHER PUBLICATIONS

NSN, Nokia; Discussion on LS on CN impacts of RAN2 solutions for WLAN/3GPP radio interworking; SA WG2 Meeting #102; S2-140963; Mar. 24-28, 2014; St. Julian's, Malta.
International Search Report issued in PCT/JP2015/081212; dated Jan. 26, 2016.
3rd Generation Partnership Project; Technical Specification Group Radio Access Network; Evolved Universal Terrestrial Radio Access (E-UTRA); User Equipment (UE) procedures in idle mode (Release 12); 3GPP TS 36.304 V12.1.0; Jun. 2014; pp. 1-35; 3GPP Organizational Partners.
3rd Generation Partnership Project; Technical Specification Group Radio Access Network; Study on Wireless Local Area Network (WLAN)—3GPP radio interworking (Release 12); 3GPP TR 37.834 V12.0.0; Dec. 2013; pp. 1-5; 3GPP Organizational Partners.
CATT; "Traffic Steering of Solutions without ANDSF"; 3GPP TSG RAN WG2 Meeting #84; R2-133892; Nov. 11-15, 2013; pp. 1-3; San Francisco, USA.

* cited by examiner

CORE NETWORK APPARATUS, RADIO TERMINAL, AND BASE STATION

TECHNICAL FIELD

The present invention relates to a core network apparatus, a radio terminal, and a base station used in a system in which a process of switching a communication path between a mobile communication network and a wireless LAN is performed.

BACKGROUND ART

In the past, a technique in which a radio terminal switches a communication path between a mobile communication network and a wireless LAN has been proposed (for example, see Non-Patent Literature 1). A communication path is established between a radio terminal and a core network, and switching in access point name (APN) units (or bearer units) can be performed.

The switching of the communication path is performed by network selection of selecting a network and traffic steering of routing traffic. In long term evolution (LTE), a mobile communication network is referred to as an evolved universal terrestrial radio access network (E-UTRAN), and a core network is referred to as an evolved packet core (EPC).

The radio terminal determines whether or not switching is performed on the basis of whether or not first information on a mobile communication network side satisfies a first condition and whether or not second information on a wireless LAN side satisfies a second condition. The first information is, for example, a measurement result (RSRPmeas) of a reference signal received power (RSRP) and a measurement result (RSRQmeas) of the reference signal received quality (RSRQ). The second information is, for example, a wireless LAN channel utilization value, a wireless LAN backhaul value, a received signal strength indicator (RSSI).

Determination parameters for determining whether or not the communication path between the mobile communication network and the wireless LAN is performed are notified from a base station provided in a mobile communication network to the radio terminal. As the determination parameters, there are individual parameters which are notified to the radio terminal and broadcast parameters which are broadcast to the radio terminal.

CITATION LIST

Non Patent Literature

Non-Patent Literature 1: TS36.304 V12.1.0

SUMMARY OF INVENTION

A network apparatus according to a first aspect includes a controller configured to measure a throughput of communication which is performed by a radio terminal via a wireless LAN. The controller is configured to give a notification of throughput information indicating the throughput, to a base station constituting a mobile communication network.

A radio terminal according to a second aspect includes a controller configured to measure a throughput of communication performed via a wireless LAN. The controller is configured to give a notification of throughput information indicating the throughput, to a base station constituting a mobile communication network.

A base station according to a third aspect includes a controller configured to obtain throughput information from a network apparatus or a radio terminal. The throughput information is information indicating a throughput of communication performed by the radio terminal via a wireless LAN.

DESCRIPTION OF EMBODIMENTS

Overview of the Embodiment

A core network apparatus according to a first embodiment is provided in a core network in a system in which a process of switching a communication path between a mobile communication network and a wireless LAN is performed. The core network apparatus includes a controller configured to measure a throughput of communication which is performed by a radio terminal via a wireless LAN. The controller is configured to give a notification of throughput information indicating the measured throughput, to a base station constituting the mobile communication network.

In the first embodiment, the controller is configured to start measurement of the throughput in response to reception of first switching information reported from the radio terminal. The first switching information is information indicating that the radio terminal switches a communication path from the mobile communication network to the wireless LAN.

In the first embodiment, the controller is configured to end measurement of the throughput in response to reception of second switching information reported from the radio terminal. The second switching information is information indicating that the radio terminal switches the communication path from the wireless LAN to the mobile communication network.

In the first embodiment, the throughput information is information for determining whether or not the base station permits the radio terminal to switch the communication path from the wireless LAN to the mobile communication network.

In the first embodiment, when the radio terminal switches the communication path in APN units, the controller is configured to measure the throughput in APN units.

In the first embodiment, when the radio terminal switches the communication path in bearer units, the controller is configured to measure the throughput in bearer units.

A radio terminal according to a second embodiment performs a process of switching a communication path between a mobile communication network and a wireless LAN. The radio terminal includes a controller configured to measure a throughput of communication performed via a wireless LAN. The controller is configured to give a notification of throughput information indicating the throughput, to a base station constituting a mobile communication network.

In the second embodiment, the controller is configured to start measurement of the throughput when first switching information is transmitted. The first switching information is information indicating that the radio terminal switches the communication path from the mobile communication network to the wireless LAN.

In the second embodiment, the controller is configured to end measurement of the throughput when second switching information is transmitted or when a radio environment of the wireless LAN deteriorates. The second switching information is information indicating that the radio terminal switches the communication path from the wireless LAN to the mobile communication network.

In the second embodiment, the throughput information is information for determining whether or not the base station permits the radio terminal to switch the communication path from the wireless LAN to the mobile communication network.

In the second embodiment, when the radio terminal switches the communication path in APN units, the controller is configured to measure the throughput in APN units.

In the second embodiment, when the radio terminal switches the communication path in bearer units, the controller is configured to measure the throughput in bearer units.

In the second embodiment, the throughput information is included in a message transmitted from the radio terminal to the base station. The message is a message for requesting establishment of an RRC connection with the base station or a message for changing an RRC configuration of the radio terminal.

A base station according to first and second embodiments is provided in a mobile communication network in a system in which a process of switching a communication path between a mobile communication network and a wireless LAN is performed. The base station includes a controller configured to obtain throughput information from a network apparatus or a radio terminal. The throughput information is information indicating a throughput of communication performed by the radio terminal via a wireless LAN.

In the first and second embodiments, the controller is configured to determine whether or not the radio terminal is permitted to switch a communication path from the wireless LAN to the mobile communication network on the basis of the throughput information.

In the first and second embodiments, when a predicted throughput of the communication performed by the radio terminal via the base station is lower than the throughput indicated by the throughput information, the controller is configured not to permit the radio terminal to switch the communication path from the wireless LAN to the mobile communication network.

In the first embodiment, the throughput information is included in a first message transmitted from the network apparatus to the base station. The first message is a message for requesting establishment of one or more bearers between the radio terminal and the network apparatus via the base station.

In the second embodiment, the throughput information is included in a second message transmitted from the radio terminal to the base station. The second message is a message for requesting establishment of an RRC connection with the base station or a message for changing an RRC configuration of the radio terminal.

First Embodiment (Configuration of Communication System)

Figure 1:
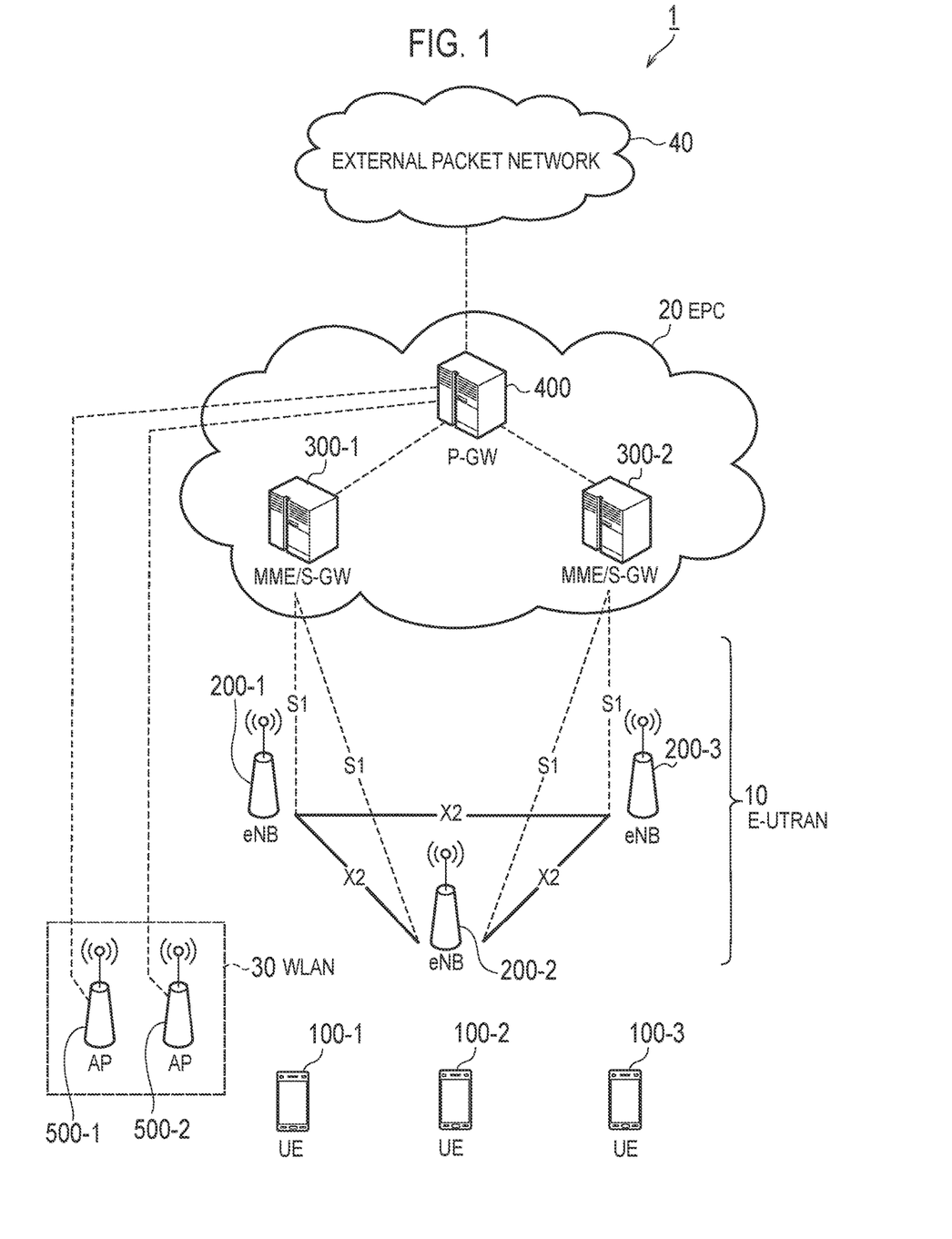
FIG. 1 is a diagram illustrating a communication system according to first and second embodiments.

A communication system according to a first embodiment will be described below. FIG. 1 is a diagram illustrating a communication system 1 according to the first embodiment. In the first embodiment, LTE is employed as a mobile communication scheme.

As illustrated in FIG. 1, the communication system 1 includes an E-UTRAN 10, an EPC 20, a wireless LAN (WLAN) 30, an external packet network 40, and a user equipment (UE) 100. The UE 100 corresponds to a radio terminal. In the first embodiment, the E-UTRAN 10 corresponds to the mobile communication network. Further, the EPC 20 corresponds to the core network.

The E-UTRAN 10 includes an evolved Node-B (eNB 200). In the first embodiment, the eNB 200 corresponds to the base station provided in the mobile communication network. The eNB 200 manages one or more cells. A cell may be regarded as a term indicating a geographical area or may be regarded as a function of performing radio communication with the UE 100. The eNBs 200 are connected to each other via an X 2 interface. A configuration of the eNB 200 will be described later.

The EPC 20 includes a mobility management entity (MME)/serving-gateway (S-GW) 300 and a packet data network gateway (P-GW) 400. The MME performs various kinds of mobility control such as location registration and handover of the UE 100. The S-GW performs control such that user data is relayed between the P-GW 400 and the eNB 200. The MME/S-GW 300 is connected to the eNB 200 via an S1 interface.

The P-GW 400 has a function as a connection point with the external packet network 40 and a function as a connection point with the WLAN 30. The P-GW 400 performs the allocation of an IP address to the UE 100, authentication at the time of establishing the bearer, and the like. Further, the P-GW 400 performs control such that user data is relayed from the external packet network 40 or to the external packet network 40. In the first embodiment, the P-GW 400 corresponds to a core network apparatus provided in the core network.

The external packet network 40 is disposed outside the EPC 20 and is a packet network such as the Internet and/or an operator service network.

The WLAN 30 includes an access point (AP) 500. The AP 500 is configured in conformity with, for example, an IEEE 802.11 standard. The AP 500 performs radio communication with the UE 100 at a frequency band different from a frequency band of LTE communication (for example, an unlicensed band).

The UE 100 is a terminal such as a mobile phone, a tablet, or a card type terminal. In addition to the function of performing radio communication with the eNB 200, the UE 100 has a function of performing radio communication with the AP 500. A configuration of the UE 100 will be described later.

(Overview of Switching Process)

Figure 2:
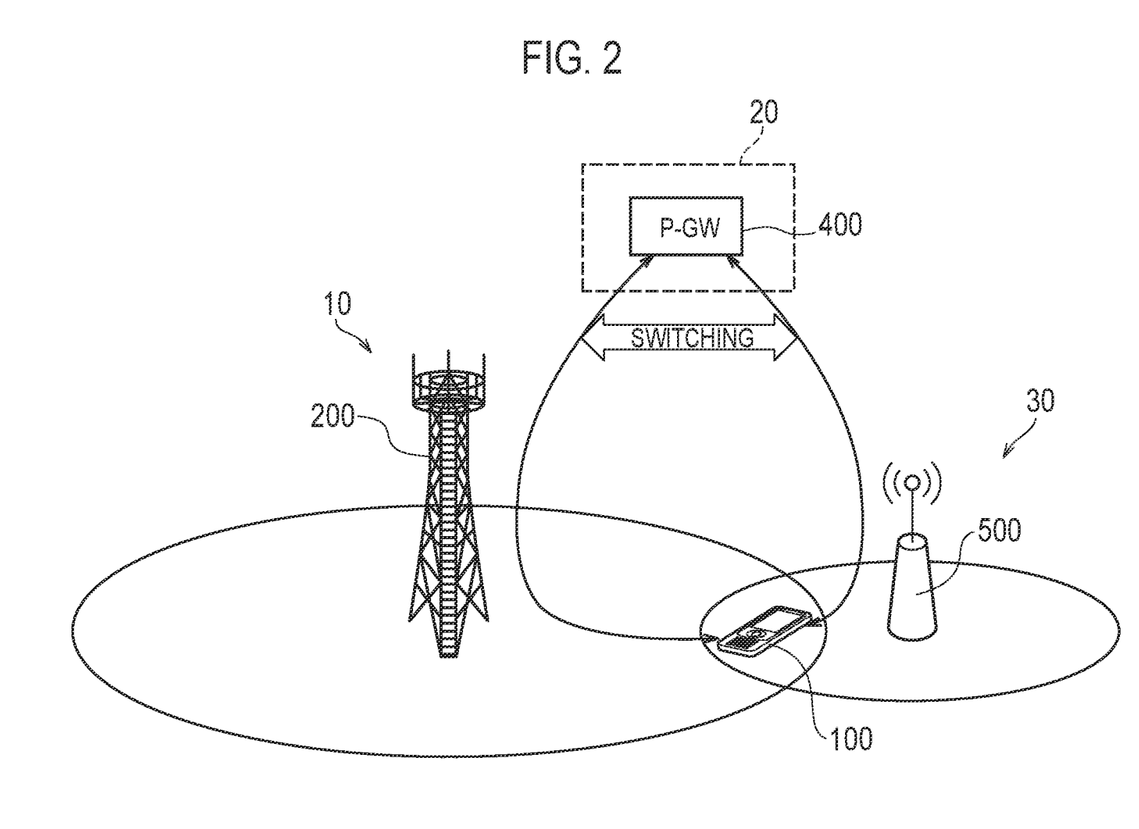
FIG. 2 is a diagram illustrating a switching process according to the first and second embodiments.

A method in which the UE 100 performs a switching process (for example, network selection and traffic steering)

for switching the communication path between the E-UTRAN 10 and the WLAN 50 will be described. FIG. 2 is a diagram illustrating the switching process according to the first embodiment.

As illustrated in FIG. 2, the eNB 200 provides a mobile communication service of LTE in its own coverage area. The coverage area of eNB 200 is configured with one or more cells. The AP 500 provides a wireless LAN service in its own coverage area. A part or all of the coverage area of the AP 500 overlaps the coverage area of the eNB 200.

The UE 100 in an RRC connected state or an RRC idle state performs the switching process to select one of the E-UTRAN 10 and the WLAN 50 as a radio access network in which transmission and reception of traffic are performed. In detail, when the state in which the first information on the E-UTRAN 10 side satisfies the first condition, and the second information on the WLAN 50 side satisfies the second condition is continued for a predetermined period, the switching process (for example, network selection and traffic steering) is performed.

A communication path in which transmission and reception of traffic are performed is established between the UE 100 and the P-GW 400. In the first embodiment, the switching process includes both a process in which the UE 100 switches the communication path from the E-UTRAN 10 to the WLAN 50 and a process in which the UE 100 switches the communication path from the WLAN 50 to the E-UTRAN 10. The switching of the communication path is performed in APN units. Alternatively, the switching of the communication path may be performed in bearer units.

Here, the first information on the E-UTRAN 10 side includes, for example, a measurement result (RSRPmeas) of a signal level of a received signal (reference signal received power (RSRP)) and a measurement result (RSRQmeas) of a signal quality of a received signal (reference signal received quality (RSRQ)).

The second information on the WLAN 50 side includes, for example, a channel utilization value of the WLAN 50 (ChannelUtilizationWLAN), a downlink backhaul value of the WLAN 50 (BackhaulRateDlWLAN), an uplink backhaul value of the WLAN 50 (BackhaulRateUlWLAN), and a signal level of a received signal (a received signal strength indicator (RSSI)).

Switching Process from E-UTRAN 10 to WLAN 50

The first condition that the UE 100 switches the communication path from the E-UTRAN 10 to the WLAN 50 is, for example, that one of the following conditions (1a) or (1b) be satisfied. However, the first condition may be that both of the following conditions (1a) and (1b) be satisfied.

$$\text{RSRPmeas} < \text{Thresh}_{ServingOffloadWLAN,LowP} \tag{1a}$$

$$\text{RSRQmeas} < \text{Thresh}_{ServingOffloadWLAN,LowQ} \tag{1b}$$

"$\text{Thresh}_{ServingOffloadWLAN,LowP}$" and "$\text{Thresh}_{ServingOffloadWLAN,LowQ}$" are threshold values provided from the eNB 200 or predetermined threshold values.

The second condition that the UE 100 switches the communication path from the E-UTRAN 10 to the WLAN 50 is that, for example, all of the following conditions (1c) to (1f) be satisfied. However, the second condition may be that any one of the following conditions (1c) to (1f) be satisfied.

$$\text{ChannelUtilizationWLAN} < \text{Thresh}_{ChUtilWLAN,Low} \tag{1c}$$

$$\text{BackhaulRateDlWLAN} > \text{Thresh}_{BackhRateDLWLAN,High} \tag{1d}$$

$$\text{BackhaulRateUlWLAN} > \text{Thresh}_{BackhRateULWLAN,High} \tag{1e}$$

$$\text{RSSI} > \text{Thresh}_{BEACONRSSI,High} \tag{1f}$$

"$\text{Thresh}_{ChUtilWLAN,Low}$," "$\text{Thresh}_{BackhRateDLWLAN,High}$," "$\text{Thresh}_{BackhRateULWLAN,High}$," and "$\text{Thresh}_{BEACONRSSI,High}$" are threshold values provided from the eNB 200 or predetermined threshold values.

Switching Process from WLAN 50 to E-UTRAN 10

The first condition that the UE 100 switches the communication path from the WLAN 50 to the E-UTRAN 10 is that, for example, the following conditions (2a) and (2b) be satisfied. However, the first condition may be that either of the following conditions (2a) or (2b) be satisfied.

$$\text{RSRPmeas} > \text{Thresh}_{ServingOffloadWLAN,HighP} \tag{2a}$$

$$\text{RSRQmeas} > \text{Thresh}_{ServingOffloadWLAN,HighQ} \tag{2b}$$

"$\text{Thresh}_{ServingOffloadWLAN,HighP}$" and "$\text{Thresh}_{ServingOffloadWLAN,HighQ}$" are threshold values provided from the eNB 200 or predetermined threshold values.

The second condition that the UE 100 switches the communication path from the WLAN 50 to the E-UTRAN 10 is, for example, that one of the following conditions (2c) to (2f) be satisfied. However, the second condition may be that all of the following conditions (2c) to (2f) be satisfied.

$$\text{ChannelUtilizationWLAN} > \text{Thresh}_{ChUtilWLAN,High} \tag{2c}$$

$$\text{BackhaulRateDlWLAN} < \text{Thresh}_{BackhRateDLWLAN,Low} \tag{2d}$$

$$\text{BackhaulRateUlWLAN} < \text{Thresh}_{BackhRateULWLAN,Low} \tag{2e}$$

$$\text{RSSI} < \text{Thresh}_{BEACONRSSI,Low} \tag{2f}$$

"$\text{Thresh}_{ChUtilWLAN,High}$," "$\text{Thresh}_{BackhRateDLWLAN,Low}$," "$\text{Thresh}_{BackhRateULWLAN,Low}$," and "$\text{Thresh}_{BEACONRSSI,Low}$" are threshold values provided from the eNB 200 or predetermined threshold values.

When the above-described threshold values are not provided, the UE 100 may omit acquisition (that is, reception or measurement) of information whose threshold value is not provided.

In the first embodiment, the various threshold values described above are examples of the determination parameters (for example, RAN assistance parameters) for determining whether or not the UE 100 performs the switching process of switching the communication path between the E-UTRAN 10 and the WLAN 50. In other words, the determination parameters include one or more values selected from "$\text{Thresh}_{ServingOffloadWLAN,LowP}$," "$\text{Thresh}_{ServingOffloadWLAN,LowQ}$," "$\text{Thresh}_{ChUtilWLAN,Low}$," "$\text{Thresh}_{BackhRateDLWLAN,High}$," "$\text{Thresh}_{BackhRateULWLAN,High}$," "$\text{Thresh}_{BEACONRSSI,High}$," "$\text{Thresh}_{ServingOffloadWLAN,HighP}$," "$\text{Thresh}_{ServingOffloadWLAN,HighQ}$," "$\text{Thresh}_{ChUtilWLAN,High}$," "$\text{Thresh}_{BackhRateDLWLAN,Low}$," "$\text{Thresh}_{BackhRateULWLAN,Low}$," and "$\text{Thresh}_{BEACONRSSI,Low}$."

Further, the determination parameters may include a predetermined period ($\text{Tsteering}_{WLAN}$) in which the state in which the first condition or the second condition is satisfied is continued.

The determination parameters include individual parameters which are individually notified from the eNB 200 to the UE 100 and the broadcast parameters which are broadcast from the eNB 200 to the UE 100. The individual parameters are included in, for example, an RRC message (for example, RRC Connection Reconfiguration) which is transmitted from the eNB 200 to the UE 100. The broadcast parameters are included in, for example, an SIB (for example, WLAN-OffloadConfig-r12) which is broadcast from the eNB 200. It should be noted that, when the individual parameters are received in addition to the broadcast parameters, the UE 100 applies the individual parameters more preferentially than the broadcast parameters.

(Configuration of Radio Terminal)

Figure 3:
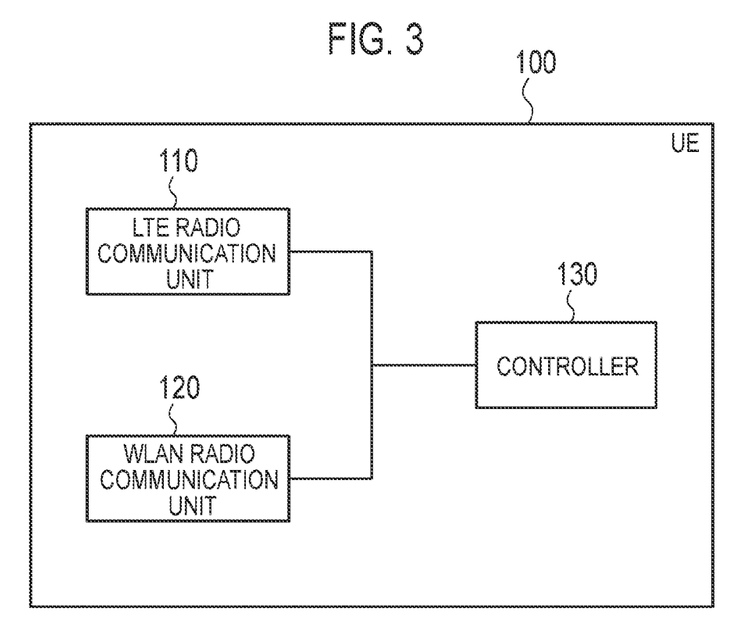
FIG. 3 is a block diagram illustrating a configuration of a UE (radio terminal) according to the first and second embodiments.

A configuration of the UE 100 (the radio terminal) according to the first embodiment will be described below. FIG. 3 is a block diagram illustrating a configuration of the UE 100 according to the first embodiment.

As illustrated in FIG. 3, the UE 100 includes an LTE radio communication unit 110, a WLAN radio communication unit 120, and a controller 130.

The LTE radio communication unit 110 has a function of performing radio communication with the eNB 200 and is configured with, for example, a radio transceiver. For example, the LTE radio communication unit 110 periodically receives the reference signal from the eNB 200. The LTE radio communication unit 110 periodically measures the signal level of the reference signal (RSRP) and the signal quality of the reference signal (RSRQ). The LTE radio communication unit 110 receives the individual parameters and the broadcast parameters from the eNB 200 as the determination parameters.

The WLAN radio communication unit 120 has a function of performing radio communication with the AP 500 and is configured with, for example, a radio transceiver. For example, the WLAN radio communication unit 120 receives a beacon or probe response from the AP 500. The beacon or probe response includes a BBS load information element, and the channel utilization value (ChannelUtilizationWLAN) of the WLAN 50 can be acquired from the BBS load information element.

The WLAN radio communication unit 120 receives a response (a generic advertisement service (GAS) response) which is transmitted from the AP 500 in response to a request (GAS request) with respect to the AP 500. The response (GAS response) includes the downlink backhaul value (BackhaulRateDlWLAN) of the WLAN 50 and the uplink backhaul value (BackhaulRateUlWLAN) of the WLAN 50. Such a query procedure is performed in accordance with an access network query protocol (ANQP) specified in Hotspot 2.0 of Wi-Fi alliance (WFA).

The WLAN radio communication unit 120 receives a signal from the AP 500. The WLAN radio communication unit 120 measures the signal level of the received signal (RSSI). The signal level of the received signal (RSSI) is the signal strength of the beacon or probe response.

The controller 130 is configured with a CPU (processor), a memory, and the like, and controls the UE 100. In detail, the controller 130 controls the LTE radio communication unit 110 and the WLAN radio communication unit 120. When the state in which the first information on the E-UTRAN 10 side satisfies the first condition, and the second information on the WLAN 50 side satisfies the second condition is continued for a predetermined period, the controller 130 performs the switching process for switching the communication path between the E-UTRAN 10 and the WLAN 50.

(Configuration of Base Station)

Figure 4:
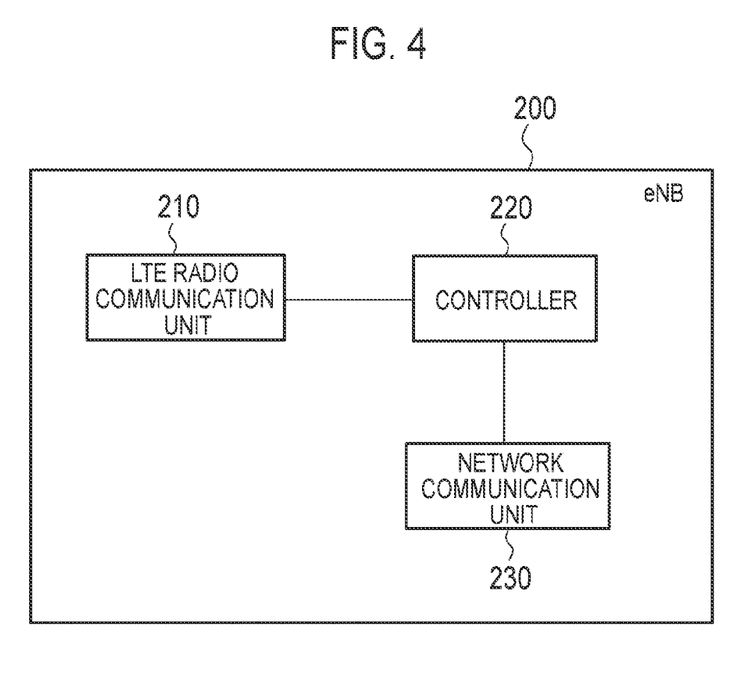
FIG. 4 is a block diagram illustrating a configuration of an eNB (base station) according to the first and second embodiments.

A configuration of the eNB 200 (the base station) according to the first embodiment will be described below. FIG. 4 is a block diagram illustrating a configuration of the eNB 200 according to the first embodiment.

As illustrated in FIG. 4, the eNB 200 includes an LTE radio communication unit 210, a controller 220, and a network communication unit 230.

The LTE radio communication unit 210 has a function of performing radio communication with the UE 100. For example, the LTE radio communication unit 210 periodically transmits the reference signal to the UE 100. The LTE radio communication unit 210 is configured with, for example, a radio transceiver.

The LTE radio communication unit 210 transmits the individual parameters and the broadcast parameters to the UE 100 as the determination parameters. As described above, the LTE radio communication unit 210 notifies the UE 100 of the individual parameters through the RRC message (for example, RRC Connection Reconfiguration), and notifies the UE 100 of the broadcast parameters through the SIB (for example, WLAN-OffloadConfig-r12).

The controller 220 is configured with a CPU (processor), a memory, and the like, and controls the eNB 200. In detail, the controller 220 controls the LTE radio communication unit 210 and the network communication unit 230. The memory constituting the controller 220 may function as a storage unit, or a memory constituting a storage unit may be provided separately from a memory constituting the controller 220.

The network communication unit 230 is connected to a neighbor base station via the X2 interface and is connected to the MME/S-GW via the S1 interface. The network communication unit 230 is used for communication performed on the X2 interface and communication performed on the S1 interface.

In the eNB 200 having the above configuration, the controller 220 acquires throughput information from the EPC 20 or the UE 100. The throughput information is information indicating the throughput of communication which the UE 100 performs with the EPC 20 via the WLAN 30. In other words, the throughput information is information indicating the throughput of the UE 100 when the UE 100 stays in the WLAN 30. The throughput may be a statistical value such as an average value. The information indicating the throughput is not limited to the value of the throughput but may be an index value of the throughput.

In the first embodiment, the throughput information is included in a first message transmitted from the EPC 20 to the eNB 200. The first message is a message (E-RAB Setup Request) for requesting establishment of one or more bearers (E-RABs) between the UE 100 and the EPC 20 via the eNB 200. The E-RAB is configured with the S1 bearer between the eNB 200 and the S-GW 300 and the radio bearer between the eNB 200 and the UE 100.

The controller 220 controls the UE 100 on the basis of the throughput information included in the first message. The controller 220 determines whether or not the UE 100 is permitted to switch the communication path from the WLAN 30 to the E-UTRAN 10.

In the first embodiment, when the throughput which can be provided from the eNB 200 to the UE 100 is lower than the throughput indicated by the throughput information, the controller 220 determines that the UE 100 is denied to switch the communication path from the WLAN 30 to the E-UTRAN 10. Then, the controller 220 may perform control such that the UE 100 switches the communication path to the WLAN 30. The controller 220 may perform the control when a condition that the difference between the throughput which can be provided from the eNB 200 to the UE 100 and the throughput indicated by the throughput information is a predetermined value or more is satisfied in addition to this condition.

Here, the throughput which can be provided from the eNB 200 to the UE 100 may be a predicted logical throughput or a measured throughput. The logical throughput can be predicted in accordance with, for example, a modulation coding scheme (MCS) corresponding to a channel state with the UE 100 and an amount of radio resources (resource blocks (RBs)) that can be allocated to the UE 100.

The control for causing the UE 100 to switch the communication path to the WLAN 30 includes first to third controls. The first control is control of rejecting, when an establishment request for an RRC connection is received from the UE 100, the establishment request. The second control is control of releasing the RRC connection when the RRC connection with the UE 100 has already been established. The third control is control of changing a parameter (a determination parameter) used for determining whether or not the communication path is switched from the EUTRAN 10 to the WLAN 50 and notifies the UE 100 of the changed parameter. The third control may be used in combination with the first control or the second control. It is desirable that the parameter to be changed is an individual parameter which is individually notified to the UE 100.

In the third control, the controller 220 performs a setting of increasing the threshold value related to the first information on the E-UTRAN 10 side. Alternatively, the threshold value related to the second information on the WLAN 50 side is set to be low. In other words, the determination parameter is set so that the offload process to the WLAN 50 is easily performed. Alternatively, the controller 220 optimizes a timer (Tsteering WLAN Timer) indicating a predetermined period (Tsteering$_{WLAN}$). The timer is a timer that measures a minimum time (Tsteering$_{WLAN}$) in which the state in which the first information satisfies the first condition or the state in which the second information satisfies the second condition should be continued in order to perform the offload process or the reoffload process. For example, the eNB 200 sets the timer to have a value shorter than a currently set value.

(Configuration of Core Network Apparatus)

Figure 5:
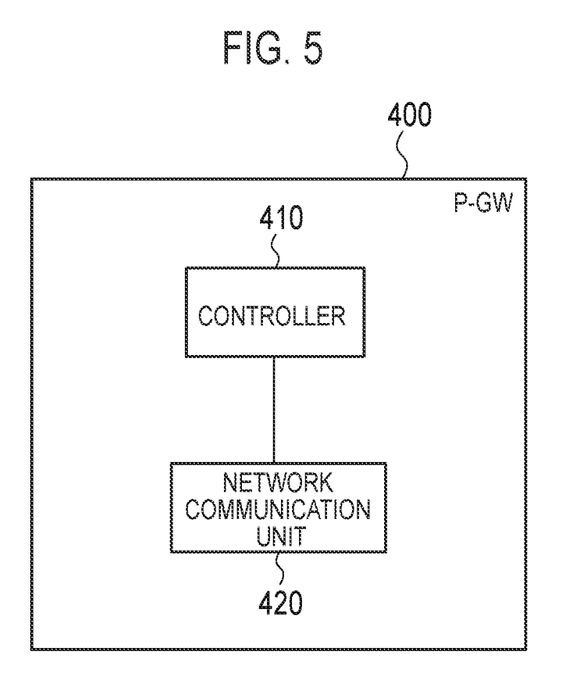
FIG. 5 is a block diagram illustrating a configuration of a P-GW (core network apparatus) according to the first and second embodiments.

A configuration of the P-GW 400 (the core network apparatus) according to the first embodiment will be described below. FIG. 5 is a block diagram illustrating a configuration of the P-GW 400 according to the first embodiment.

As illustrated in FIG. 5, the P-GW 400 includes a controller 410 and a network communication unit 420.

The controller 410 is configured with a CPU (processor), a memory, and the like, and controls the P-GW 400. In detail, the controller 410 controls the network communication unit 420. The memory constituting the controller 410 may function as a storage unit, or a memory constituting the storage unit may be provided separately from the memory constituting the controller 410.

The network communication unit 420 is connected to the MME/S-GW 300, the AP 500, and the external packet network 40. The network communication unit 420 is used for communication with the MME/S-GW 300, the AP 500, and the external packet network 40. Further, the network communication unit 420 may be connected to the eNB 200 via a predetermined interface.

In the P-GW 400 having the above configuration, the controller 410 detects that the UE 100 having the communication path with the EPC 20 via the E-UTRAN 10 switches the communication path from the eNB 200 to the WLAN 50 (that is, the offload process). For example, the controller 410 detects the offload process on the basis of the flow of the user data of the UE 100. Alternatively, the controller 410 may detect the offload process on the basis of a notification given from the UE 100 or the MME/S-GW 300.

Further, the controller 410 detects that the UE 100 has switched the communication path from the WLAN 50 to the E-UTRAN 10 (that is, the reoffload process). For example, the controller 410 detects the reoffload process on the basis of the user data flow of the UE 100. Alternatively, the controller 410 may detect the reoffload processing on the basis of the notification from the notification from the UE 100 or the MME/S-GW 300.

In response to reception of the first switching information (NAS message) reported from the UE 100 to the EPC 20, the controller 410 starts measurement of the throughput. The first switching information is information indicating that the communication path is switched from the E-UTRAN 10 to the WLAN 30.

Further, in response to reception of the second switching information (NAS message) reported from the UE 100 to the EPC 20, the controller 410 ends the measurement of the throughput. The second switching information is information indicating that the communication path is switched from the WLAN 30 to the E-UTRAN 10.

As described above, the controller 410 measures the throughput of the communication with the UE 100 from the first switching (offload process) to the second switching (reoffload process). In other words, the controller 410 measures the throughput of the UE 100 when the UE 100 stays in the WLAN 30. The controller 410 may perform a statistical process on a throughput which is periodically measured.

When the UE 100 switches the communication path in APN units, it is desirable that the controller 410 measure the throughput in APN units. When the UE 100 switches the communication path in bearer units, it is desirable that the controller 410 measure the throughput in bearer units.

The controller 410 notifies the eNB 200 of the throughput information indicating the measured throughput. The information indicating the throughput is not limited to a value of the throughput but may be an index value of the throughput. The controller 410 may notify the eNB 200 of the throughput information via the MME/S-GW 300.

Operation Sequence According to the First Embodiment

Figure 6:
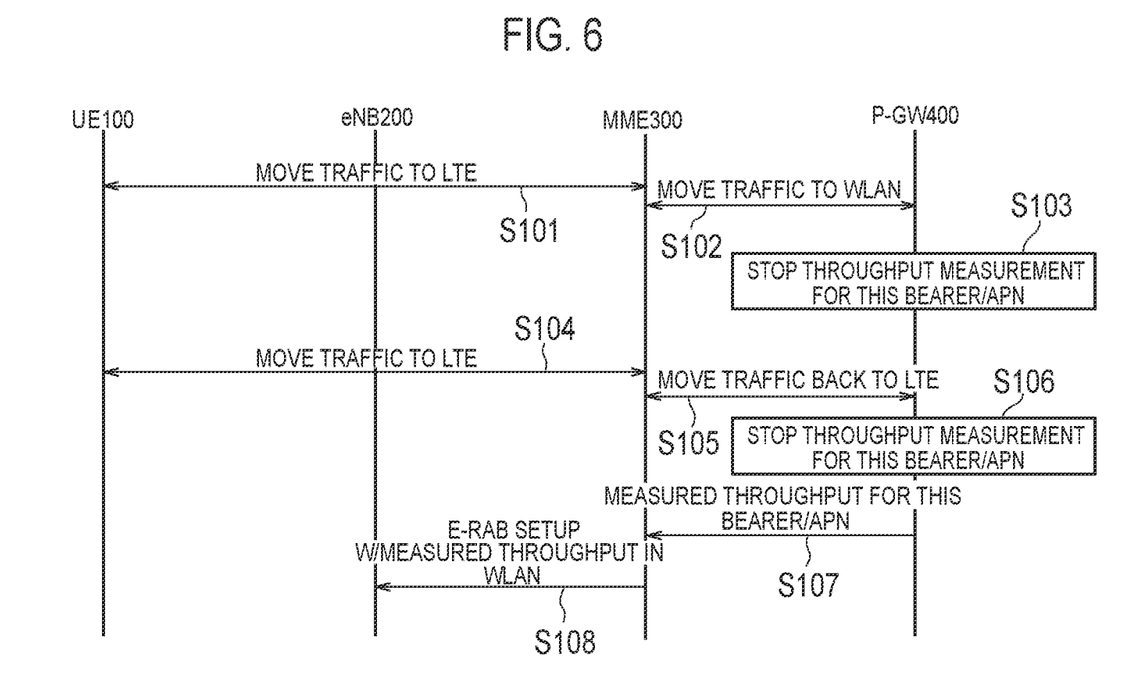
FIG. 6 is a sequence diagram illustrating an operation according to the first embodiment.

The operation sequence according to the first embodiment will be described below. FIG. 6 is a sequence diagram illustrating an operation according to the first embodiment. In an initial state of the present sequence, the communication path is established between the UE 100 and the P-GW 400. Specifically, one or more bearers (E-RABs) are established between the UE 100 and the EPC 20 via the eNB 200.

As illustrated in FIG. 6, in step S101, the UE 100 performs the offload process from the eNB 200 to the AP 500. Accordingly, the communication path between the UE 100 and the P-GW 400 is switched from the eNB 200 to the AP 500. In the present sequence, the P-GW 400 detects the offload process via an MME 300 (step S102).

In step S103, the P-GW 400 starts throughput measurement of the communication with the UE 100. As described above, the throughput measurement is performed in APN units or bearer units.

In step S104, the UE 100 performs the reoffload process from the AP 500 to the eNB 200. Accordingly, the communication path between the UE 100 and the P-GW 400 is switched from the AP 500 to the eNB 200. In the present sequence, the P-GW 400 detects the reoffload process via the MME 300 (step S105).

In step S106, the P-GW 400 ends the throughput measurement of the communication with the UE 100.

In steps S107 and S108, the P-GW 400 notifies the eNB 200 of the throughput information indicating the measured throughput via the MME 300. In detail, in step S107, the P-GW 400 transmits the throughput information to the MME 300. In step S108, the MME 300 transmits a first message (E-RAB Setup Request) including the throughput information to the eNB 200.

The eNB 200 performs control for the UE 100 on the basis of the throughput information included in the first message. In detail, the eNB 200 performs control such that the UE 100 switches the communication path to the WLAN 30 when the throughput that can be provided from the eNB 200 to the UE 100 is lower than the throughput indicated by the throughput information.

Specifically, when the RRC Connection Request is received, the eNB 200 performs the first control of rejecting the RRC Connection Request. Alternatively, when the RRC connection with the UE 100 has already been established, the eNB 200 performs the second control of releasing the RRC connection.

As described above, the UE 100 performs control such that the communication path is switched in view of the throughput when the UE 100 stays in the WLAN 30, whereby the deterioration of the service quality for the UE 100 can be suppressed.

The above-described operation will be described below in detail.

In step S104, the UE 100 starts the reoffload process from the AP 500 to the eNB 200. In other words, the UE 100 transmits the message (NAS message) indicating that the communication path between the UE 100 and the P-GW 400 starts (is requested) to be switched from the AP 500 to the eNB 200 to the MME 300. At this time, the UE 100 may transmit the message (NAS message) indicating that the communication path between the UE 100 and the P-GW 400 starts (is requested) to be switched from the AP 500 to the eNB 200 to the MME 300 by temporarily setting the RRC connected state (the state in which the RRC connection with the eNB 200 is established).

In step S105, the P-GW 400 detects that the communication path between the UE 100 and the P-GW 400 starts to be switched from the AP 500 to the eNB 200 via the MME 300.

In step S106, the P-GW 400 ends the throughput measurement of the communication with the UE 100.

Second Embodiment

Next, a second embodiment will be mainly described in connection with a difference from the first embodiment.

In the first embodiment, the P-GW 400 measures the throughput when the UE 100 stays in the WLAN 30. On the other hand, in the second embodiment, the UE 100 measures the throughput when the UE 100 stays in the WLAN 30.

In detail, in the UE 100, after first switching (the offload process) of switching the communication path from the E-UTRAN 10 to the WLAN 30 is performed, the controller 130 performs second switching (the reoffload process) of switching the communication path to the eNB 200 disposed in the E-UTRAN 10. The controller 130 measures the throughput of the communication with the EPC 20 (the P-GW 400) via the WLAN 30 and notifies the eNB 200 of the throughput information indicating the measured throughput. The throughput may be a statistical value such as an average value. The information indicating the through- put is not limited to the value of the throughput but may be an index value of the throughput.

In the second embodiment, when the first switching information (NAS message) is transmitted to the EPC 20, the controller 130 starts measurement of the throughput. The first switching information is information indicating that the communication path is switched from the E-UTRAN 10 to the WLAN 30.

Further, the controller 130 ends the measurement of the throughput when the second switching information (NAS message) is transmitted to the EPC 20 or when the radio environment of the WLAN 30 deteriorates. The second switching information is information indicating that the communication path is switched from the WLAN 30 to the E-UTRAN 10. The radio environment of the WLAN 30 deteriorates, for example, when any one of the conditions (2c) to (2f) described above is satisfied or when all of the conditions (2c) to (2f) are satisfied.

When the UE 100 switches the communication path in APN units, it is desirable that the controller 130 measures the throughput in APN units. When the UE 100 switches the communication path in bearer (E-RAB) units, it is desirable that the controller 130 measures the throughput in bearer (E-RAB) units.

In the second embodiment, the throughput information is included in the second message transmitted from the UE 100 to the eNB 200. The second message is a message (RRC Connection Request) for requesting the establishment of the RRC connection with the eNB 200 or a message (UE Assistance Information or RRC Connection Reconfiguration Complete) for changing the RRC configuration of the UE 100.

In detail, if the RRC connection of the UE 100 is released when the UE 100 stays in the WLAN 30, the RRC Connection Request may be used as the second message. If the RRC connection of the UE 100 is maintained when the UE 100 stays in the WLAN 30, the UE Assistance Information or the RRC Connection Reconfiguration Complete may be used as the second message.

Figure 7:
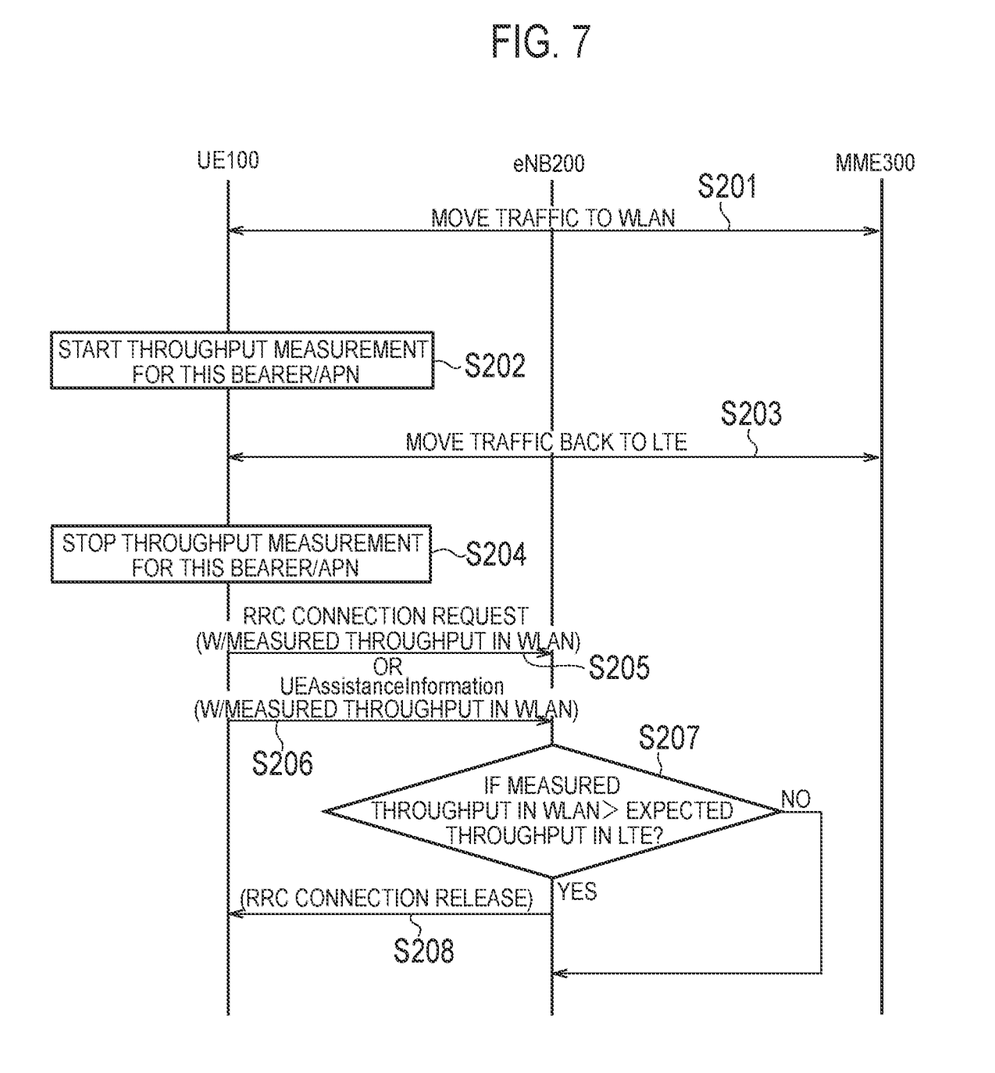
FIG. 7 is a sequence diagram illustrating an operation according to the second embodiment.

An operation sequence according to the second embodiment will be described below. FIG. 7 is a sequence diagram illustrating an operation according to the second embodiment. In the initial state of the present sequence, the communication path is established between the UE 100 and the P-GW 400. In detail, one or more bearers (E-RABs) are established between the UE 100 and the EPC 20 via the eNB 200.

As illustrated in FIG. 7, in step S201, the UE 100 performs the offload process from the eNB 200 to the AP 500. Accordingly, the communication path between the UE 100 and the P-GW 400 is switched from the eNB 200 to the AP 500.

In step S202, the UE 100 starts the throughput measurement of the communication performed via the AP 500. As described above, the throughput measurement is performed in APN units or bearer units.

In step S203, the UE 100 performs the reoffload process from the AP 500 to the eNB 200. Accordingly, the communication path between the UE 100 and the P-GW 400 is switched from the AP 500 to the eNB 200.

In step S204, the UE 100 ends the throughput measurement of the communication performed via the AP 500.

In step S205 or S206, the UE 100 includes the throughput information indicating the measured throughput in the second message and notifies the eNB 200 of the resulting second message. Here, the second message is the RRC Connection Request or the UE Assistance Information (or the RRC Connection Reconfiguration Complete). In detail, when the RRC connection of the UE 100 is released, the UE 100 notifies of the throughput information through the RRC Connection Request (step S205). When the RRC connection of the UE 100 is maintained, the UE 100 notifies of the throughput information through the UE Assistance Information (or the RRC Connection Reconfiguration Complete) (step S206).

The eNB 200 performs control for the UE 100 on the basis of the throughput information included in the second message. In detail, the eNB 200 performs control such that the UE 100 switches the communication path to the WLAN 30 when the throughput that can be provided from the eNB 200 to the UE 100 is lower than the throughput indicated by the throughput information (YES in step S207).

This control is similar to that of the first embodiment. In detail, when the RRC Connection Request is received, the eNB 200 performs the first control of rejecting the RRC Connection Request. Alternatively, when the RRC connection with the UE 100 has already been established, the eNB 200 performs the second control of releasing the RRC connection (step S208). Alternatively, the eNB 200 performs the third control of changing the parameter (the determination parameter) used for determining whether or not the communication path is switched from the E-UTRAN 10 to the WLAN 50. The third control may be used in combination with the first control or the second control.

The above-described operation will be described below in detail.

In step S203, the UE 100 starts the reoffload process from the AP 500 to the eNB 200. In other words, the UE 100 transmits the message (NAS message) indicating that the communication path between the UE 100 and the P-GW 400 starts (is requested) to be switched from the AP 500 to the eNB 200 to the MME 300. At this time, the UE 100 may transmit the message (NAS message) indicating that the communication path between the UE 100 and the P-GW 400 starts (is requested) to be switched from the AP 500 to the eNB 200 to the MME 300 by temporarily setting the RRC connected state (the state in which the RRC connection with the eNB 200 is established).

In step S204, the UE 100 stops the measurement of the throughput of the communication performed via the AP 500 using the transmission of the message in step S203 as a trigger.

In step S205, the UE 100 transmits the RRC Connection Request to the eNB 200 and requests the establishment of the RRC connection.

Steps S206 and S207 are the same as in the operation described above.

When the throughput of the WLAN is determined to be larger than the throughput of the LTE in step S207, in step S208, the eNB 200 rejects the RRC Connection Request transmitted from the UE 100 (that is, transmits the RRC Connection Reject). Or, when the UE 100 is in the RRC Connected state, the RRC Connection Release is transmitted in order to release the established RRC connection.

Other Embodiments

The first and second embodiments have been described under the assumption that a scheme of the mobile communication scheme is LTE. However, it may be a scheme other than LTE such as universal mobile telecommunications system (UMTS) or global system for mobile communications (GSM).

Although not specifically mentioned in the first and second embodiments, a program causing a computer to perform each process performed by any one of the UE 100 or the eNB 200 may be provided. Further, the program may be recorded on a computer readable medium. By using a computer-readable medium, it is possible to install the program in the computer. Here, the computer readable medium on which the program is recorded may be a non-transitory recording medium. The non-transitory recording medium is not particularly limited but may be a recording medium such as a CD-ROM or a DVD-ROM.

Alternatively, a chip configured with a memory that stores a program of performing each process performed by any one of the UE 100 and the eNB 200 and a processor that executes a program stored in the memory may be provided.

This application claims the benefit of Japanese Patent Application No. 2014-227576 filed Nov. 7, 2014, the entire contents of which are incorporated herein by reference.

INDUSTRIAL APPLICABILITY

The present invention is useful in communication fields.

The invention claimed is:

1. A radio terminal, comprising:
a controller configured to measure a throughput of communication performed via a wireless LAN, wherein
the controller is configured to give a notification of throughput information indicating the throughput, to a base station constituting a mobile communication network,
the throughput information is information for determining whether or not the base station permits the radio terminal to switch the communication path from the wireless LAN to the mobile communication network, and
the throughput information is included in a message transmitted from the radio terminal to the base station for requesting establishment of an RRC connection with the base station.

2. The radio terminal according to claim 1, wherein
the controller is configured to start measurement of the throughput when first switching information is transmitted, and
the first switching information is information indicating that the radio terminal switches the communication path from the mobile communication network to the wireless LAN.

3. The radio terminal according to claim 1, wherein
the controller is configured to end measurement of the throughput when second switching information is transmitted or when a radio environment of the wireless LAN deteriorates, and
the second switching information is information indicating that the radio terminal switches the communication path from the wireless LAN to the mobile communication network.

4. The radio terminal according to claim 1, wherein
when the radio terminal switches the communication path in APN units, the controller is configured to measure the throughput in APN units.

5. The radio terminal according to claim 1, wherein
when the radio terminal switches the communication path in bearer units, the controller is configured to measure the throughput in bearer units.

6. A base station, comprising:
a controller configured to obtain throughput information from a network apparatus or a radio terminal, wherein the throughput information is information indicating a throughput of communication performed by the radio terminal via a wireless LAN, the throughput information is information for determining whether or not the base station permits the radio terminal to switch the communication path from the wireless LAN to the mobile communication network, and the throughput information is included in a message transmitted from the radio terminal to the base station for requesting establishment of an RRC connection with the base station.

7. The base station according to claim 6, wherein the controller is configured to determine whether or not the radio terminal is permitted to switch a communication path from the wireless LAN to the mobile communication network on the basis of the throughput information.

8. The base station according to claim 7, wherein when a predicted throughput of the communication performed by the radio terminal via the base station is lower than the throughput indicated by the throughput information, the controller is configured not to permit the radio terminal to switch the communication path from the wireless LAN to the mobile communication network.

* * * * *